July 12, 1966  K. EICKMANN  3,260,213
COMBUSTION ENGINE FOR CONVEYING A HYDRAULIC PRESSURE MEDIUM
Original Filed Aug. 1, 1961  9 Sheets-Sheet 1

Fig. 1

INVENTOR.
KARL EICKMANN
BY

July 12, 1966 K. EICKMANN 3,260,213
COMBUSTION ENGINE FOR CONVEYING A HYDRAULIC PRESSURE MEDIUM
Original Filed Aug. 1, 1961 9 Sheets-Sheet 8

Fig. 8

INVENTOR.
KARL EICKMANN
BY
Michael J. Striker

July 12, 1966 K. EICKMANN 3,260,213
COMBUSTION ENGINE FOR CONVEYING A HYDRAULIC PRESSURE MEDIUM
Original Filed Aug. 1, 1961 9 Sheets-Sheet 9

Fig. 9

INVENTOR.
KARL EICKMANN
BY
Michael J. Striker

United States Patent Office 3,260,213
Patented July 12, 1966

3,260,213
COMBUSTION ENGINE FOR CONVEYING A
HYDRAULIC PRESSURE MEDIUM
Karl Eickmann, 2420 Isshiki, Hayama-machi,
Miuragun, Kanagawa-ken, Japan
Original application Aug. 1, 1961, Ser. No. 128,490, now
Patent No. 3,174,432, dated Mar. 23, 1965. Divided
and this application Feb. 14, 1964, Ser. No. 344,888
Claims priority, application Switzerland, Aug. 12, 1960,
9,162/60
25 Claims. (Cl. 103—54)

This is a divisional out of my copending patent application Serial Number 128,490 now Patent No. 3,174,432.

The present invention relates to internal combustion engines in which the combustion process occurs in the usual manner as, for example, in Otto or diesel engines, but in which the reciprocating movement of the piston in the cylinder is not utilized for driving a crankshaft but for driving one or more pump pistons which first exert a suction upon a hydraulic medium and then propel this medium away under pressure and thus operate like a pump.

In the said copending patent application it has been described that conventional combustion engines are limited by the number of cylinders in the same engine and thereby in output power and that frictional losses are appearing during the transmission of the piston power into the rotary power of the crank shaft.

In the said patent application it has been discovered, that the expansion stroke of the combustion engine main piston can be used for expelling fluid out of a pumping chamber and that the said main piston can be governed and driven for a compression stroke by means of fluid pressed out from a second auxiliary chamber into a first auxiliary chamber wherein a piston rod of said main piston is able to reciprocate. These discoveries of the parental patent application have reduced the friction in combustion engine power plants and have made it possible to control the compression stroke of the main piston as well as to combine a plurality of combustion engine units for conveying hydraulic fluid to the same hydraulic motor, cylinder or the like.

However, it is still possible to rationalize the operation of hydro-fluid conveying combustion engines further, if the product, power times velocity, of the pump piston means can be kept substantially equal to the product, power times velocity, of the respective combustion engine main piston during the respective expansion stroke of the main piston.

It is therefore the principal object of the present invention to provide transmission means between the main piston and the pump piston or pump pistons for keeping the power $P_2 \times W_2$ (force multiplied by the velocity) of the pump piston or the sum of the powers of the pump pistons substantially equal to the power $P_1 \times W_2$ (force multiplied by the velocity) of the main piston during the expansion stroke of the main piston.

Another object of the invention is, to provide pump cylinders which are able to swing around an axis normal to the cylinder axis, to reciprocate pistons in said pump cylinders and to connect said pistons to the main piston or to a piston rod thereof.

A further object of the invention is, to provide curved shablones, plates or bodies on the piston rod of the main piston for driving a respective pump piston or pump pistons.

According to the invention it is further possible to build combustion engines of any desired output. Thus, for example, it is possible according to the invention to employ cylinders of a standard size for producing engines of entirely different outputs. This may be attained by employing any desired number of combustion engines of the inventive design, all of which pump into a common pressure line. There is no limit to the number of cylinders which may be used. If, for example, a combustion engine according to the invention has an output of X H.P. and a certain number Q of such engines with an output X are connected in series, they would produce in a common pressure line a total output of $Q \times X$. If the engine according to the invention has, for example, a standard output of 7 H.P., for example, for driving a small motor cycle, and if 4,000 of such engines are connected in series, they would produce a total output of, for example, 28,000 H.P. which is sufficient to drive a giant ship of 100,000 tons. A further advantage attained according to the invention by connecting the combustion engines in series consists in the fact that individual damaged engines may be disconnected from the common pressure line, for example, by shut-off valves, and may be repaired while the other engines continue to operate without requiring the operation of a driven unit, for example, a vehicle, machine, ship, or airplane to be stopped.

The energy of the pressure medium which is produced by the combustion engines according to the invention may be converted at any desired point into the desired working movement by means of hydraulic cylinders or hydraulic rotary engines, for example, oil engines or hydraulic motors.

A still further object of the invention is, to group a number of combustion engine cylinders in series, to use a second chamber in the former cylinder for providing compressed gas for a later cylinder, to provide passages from the second chamber of former cylinders to the main chambers of later cylinders and to govern the timing of the actions of the single combustion engines in the group of combustion engines.

A further important advantage of the new engine according to the invention is the fact that the volume of the pressure medium produced may be controlled. This control may be very simply attained by an adjustment of the stroke of the pump pistons. Furthermore, the control of the current of pressure medium may be infinitely variable. For this purpose, the supporting means of the pump cylinders may be designed so as to be adjustable.

While the engine is being started and running idle, the volume of pressure medium may be set to zero.

The control mechanism for regulating the volume of pressure medium also permits the usual clutch and gears subsequent to the engine to be omitted.

If a cam control for the pump piston or pistons is applied, the pressure—by volume characteristic resulting from the thermodynamic conditions in the main engine cylinder may be very accurately transferred to the power-times-distance conditions of the pump piston which could not be achieved in crank shaft engines which are dependent upon the crank shaft kinematics.

In other kinds of pump pistons and pump cylinder bearings according to the invention it is possible to limit the rocking movement about the bearing pins to less than 160 degrees, whereas the crankshafts of former 2-cycle engines required a rotation of 360 degrees and those of 4-cycle engines a rotation of 720 degrees. The friction occurring in the power-transmitting mechanism is therefore reduced according to the invention by more than one-half.

The aforementioned as well as a considerable number of additional objects, features, and advantages of the present invention will become further apparent from the following detailed description thereof, particularly when the same is read with reference to the accompanying drawings, in which—

Figure 1:
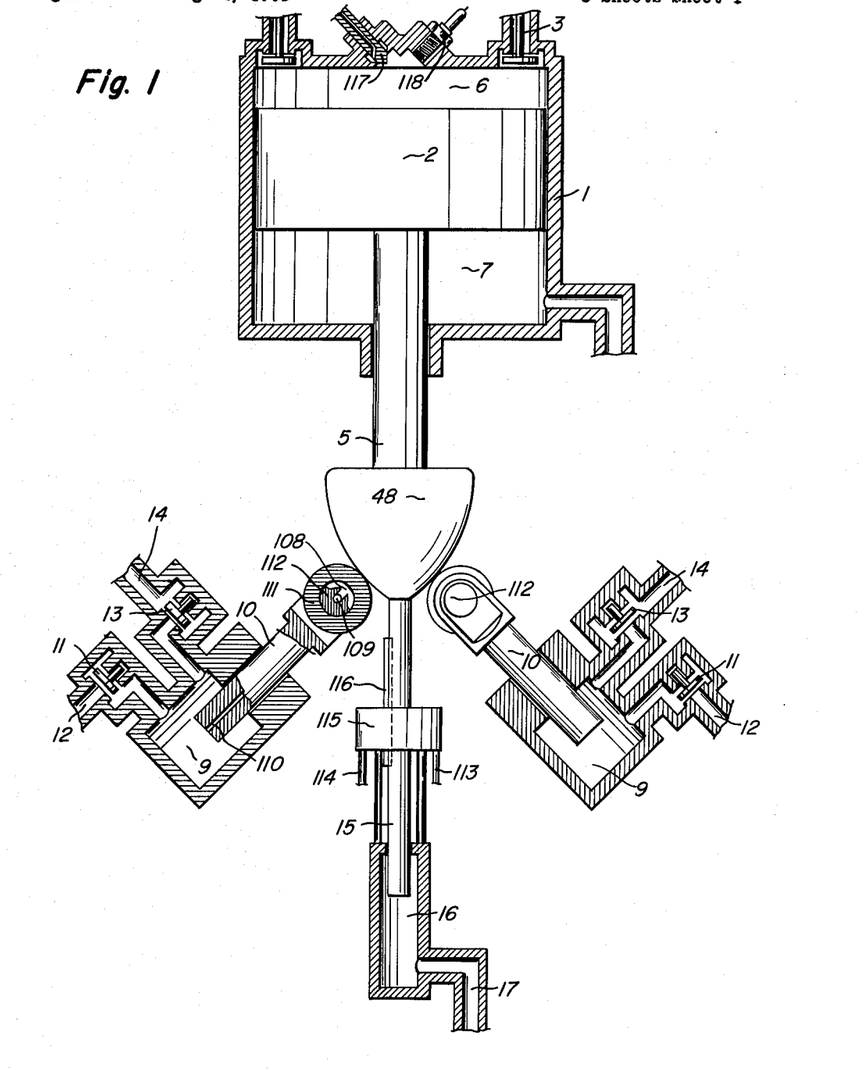
FIGURE 1 shows a cross section of a combustion engine according to a first embodiment of the invention.

Referring now to the drawings, FIG. 1 illustrates how the force-times-distance conditions occurring during the stroke of piston 2 may be adapted to the volume of pressure-medium conveyed. The internal combustion engine 1 according to the invention has a combustion chamber 6 in which the combustion occurs in the conventional manner. The combustion may occur either by the constant-pressure process or by the constant-volume process or by a mixed process. The ignition of the fuel also occurs in a conventional manner either by an ignition of the compressed mixture of fuel and air or by the injection of fuel into the compressed air as in a diesel engine. The combustion chamber 6 is therefore equipped in the usual manner either with sparkplugs 118 or with injection nozzles 117. As indicated diagrammatically in the drawing, combustion chamber 6 is further provided with conventional inlet valves 3 and exhaust valves 4 which operate in the usual manner. Piston 2 also compresses air or a fuel mixture in the usual manner and the combustion process also occurs in the combustion chamber 6 in the manner as usual in combustion engines. Under the action of the pressure occurring in the combustion chamber during and after the combustion, piston 2 carries out a downward stroke in cylinder 1. The lower end of this cylinder is, however, preferably not open but closed and provided with central guiding means for the piston rod 5. A further chamber 7 can thus be formed in cylinder 1 underneath piston 2 and the volume of this chamber increases and decreases during the reciprocating strokes of piston 2. This chamber 7 may be utilized as a second combustion chamber or as a supercharger or as an air pump or as a pump for the fuel and air mixture. Chamber 7, may, however, also be connected with the outer atmosphere by a channel 8 and thereby become out of special functions or duties.

Piston rod 5 forms an extension of piston 2 and is coaxial therewith. It is slidable within a lower piston-rod guide on cylinder 1 and reciprocates together with piston 2.

For effecting the compression stroke of piston 2, special means are provided which according to the embodiment as shown in FIG. 1 consists of a piston rod extension 15 of a reduced diameter which is movable into a further auxiliary or pump chamber 16. If the pressure medium is passed through passage 17 into chamber 16, it presses against the piston rod extension 15 and forces the same out of chamber 16. This results in the upward or compression stroke of piston 2.

Instead of effecting the compression stroke hydraulically, it is, of course, also possible to do this by mechanical means as illustrated, for example, in FIG. 2 of the parental patent application S.N. 128,490. In this case, the piston rod extension 15 projects from a pump chamber to the outside and slides or rolls along a cam which is secured by a key on a cam shaft. The end 15 of the piston rod may then be provided with a roller or similar means for reducing the friction on the cam. This cam may be designed so as to effect the compression or upward stroke of piston 2 through its piston rod 15 at the proper time and for the proper distance as may be desired or required.

It is also possible to control several cylinders together either by mechanical or hydraulic means. One of the many possibilities of doing this is illustrated, for example, in FIG. 6. The piston rod ends 15 of three different engine cylinders are movable into three different displacement chambers which are connected by pressure lines to other displacement chambers in which the other displacement pistons are movable in the axial direction. The cams may be of such a shape that the product of force-times-distance of the respective compressing piston remains constant so as to insure that the cam shaft will be driven at a uniform output.

According to other embodiments of the invention, the cams may also be specially designed to effect another force-times-distance characteristic during the compression. If, for example, a very high compression is desired in the cylinder for increasing the thermodynamic efficiency, the period of the compression stroke may be shortened by a suitable cam shape. It is thus possible to reduce the leakage losses between cylinder 1 and piston 2 and to increase the thermal and the total efficiency of the combustion engine.

The piston movements of the pumping pistons may also be adapted in a similar manner to the periods of the combustion in cylinder 6. The efficiency of the combustion output and thus the total efficiency of the combustion output and thus the total efficiency of the engine may thereby be increased. Piston rod 5 is for this purpose provided with cams 48 along which the pump pistons 10 may roll or slide. For reducing the friction, pump pistons 10 may be provided with rollers or wheels 111 which are mounted on bearing pins 112. In these bearing pins 112 or in pistons 10 balancing fields 108 may be provided into which the pressure-medium may be conducted from cylinder 9 for example, through the pressure lines 109 and 110. The pressures which are thus produced in the balancing fields 108 compensate other effective pressures either entirely or at least partly and thus reduce the friction losses. Pump pistons 10 are movable in pump chambers 9 in which they produce a pressure current through injection valves 11 and pressure valves 13. The advantage of this arrangement consists in the fact that cams 48 may be very accurately adapted to the release pressures on piston 2. Cams 48 should therefore extend more steeply at the beginning of the release stroke and effect a greater pumping stroke on pump pistons 10, while toward the end of the release stroke they effect at the same piston stroke a smaller pump piston stroke by the fact that cams 48 are straighter. Between the beginning and the end of the release stroke of piston 2 cams 48 may be adapted very accurately to the polytropic release within the combustion chamber. In this manner it is possible at different pressures in the combustion chamber to maintain a uniform pressure within the pump chamber 9, while the volume conveyed from the pump chamber 9 varies and is proportional to the output of energy delivered from the cylinder chamber. Piston rod 5 or the extension 15 thereof may be driven by rotary elements or rotary motors 115, and the connection between the rotary drive and the piston rod may be effected by conventional means, for example, by splines 116. By superimposing the rotary and reciprocating movements with each other the sliding and sealing conditions of the pistons, piston rings, and piston rods will be favorably unfluenced. The rotary motor 115 may be driven hydraulically or pneumatically, for example, by a pressure-medium which is passed into the motor through a line 113 and is discharged therefrom through a line 114.

In order to avoid lateral forces on piston rod 5, two or more pump pistons 10 may be arranged around cam 48 so that the resultance of these forces will neutralize each other in a lateral direction on piston rod 5.

Figure 2:
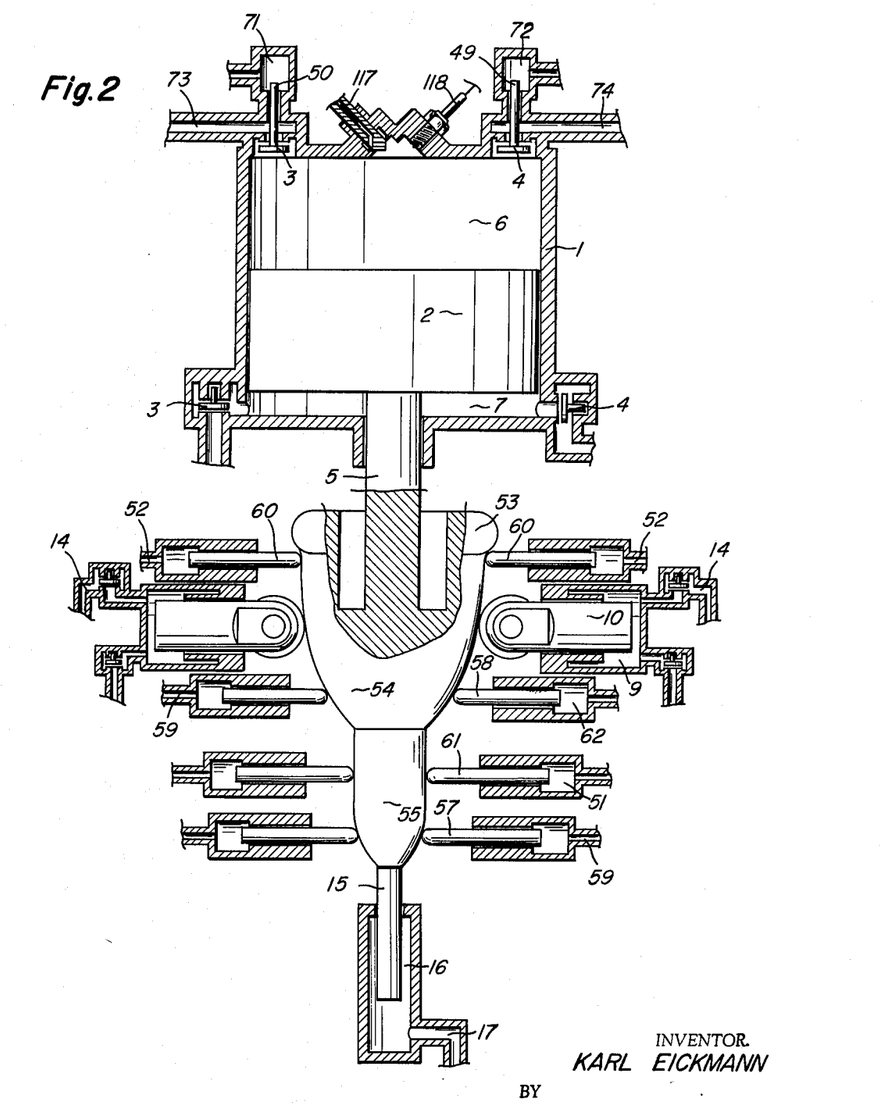
FIGURE 2 shows a further modification of the engines according to the invention.

FIG. 2 illustrates by another embodiment of the invention how the force-times-distance conditions may be adapted during the stroke of the piston 2 to the volume of pressure-medium conveyed and how the stroke of piston 2 may at the same time be utilized for emitting hydraulic impulses for control or actuating mechanism. Piston rod 5 is for this purpose provided with cams 53, 54, and 55. Cam 53 actuates, for example, the displacement piston 60 which conducts the hydraulic impulse through the pressure line 52 to an injection device or ignition device of another engine cylinder. Cam 54 controls, for example, the pump pistons 10 which produce the pump medium energy and transmit the same through the pressure line 14. Cam 54 or another cam may also drive the impulse piston or pistons 58 which transmit the control pressure medium for the compression movement of another engine piston through the lines 62. Cam 55 may act upon the displacement piston or pistons 61, for example for controlling one of the valves, and conduct the hydraulic impulse further through lines 51. The control cam 55 may also actuate one or more further displacement pistons 57 which may transmit further hydraulic impulses through lines 59, for example, for controlling a further valve. The cams or the impulse pistons may also be arranged in a different manner, for example, in such a manner on piston rod 5 that the impulses will drive the valves of the cylinders and the injection or ignition device.

The shafts of valves 3 and 4 may, for example, be designed in the forms of hydraulic pistons, as indicated at 49 and 50. Pistons 49 and 50 may plunge into cylinders 71 and 72, respectively. If a pressure medium is then conducted through lines 73 or 74 into cylinder chambers 71 or 72 valves 3 or 4 may thereby be opened for a certain length of time and for a certain distance. If line 51 is connected to line 73 of another engine cylinder and if line 59 is connected to line 74 of the same other cylinder and line 62 is connected to line 17 of the same other cylinder, the effect will be attained that during the expansion stroke of piston 2 the valves and the compression stroke of another cylinder may be controlled very accurately by means of the different cams on piston rod 5 and the respective connecting lines. The same applies to the control of the ignition or injection device of another cylinder by means of cam 53 and the displacement piston 60.

Figure 3:
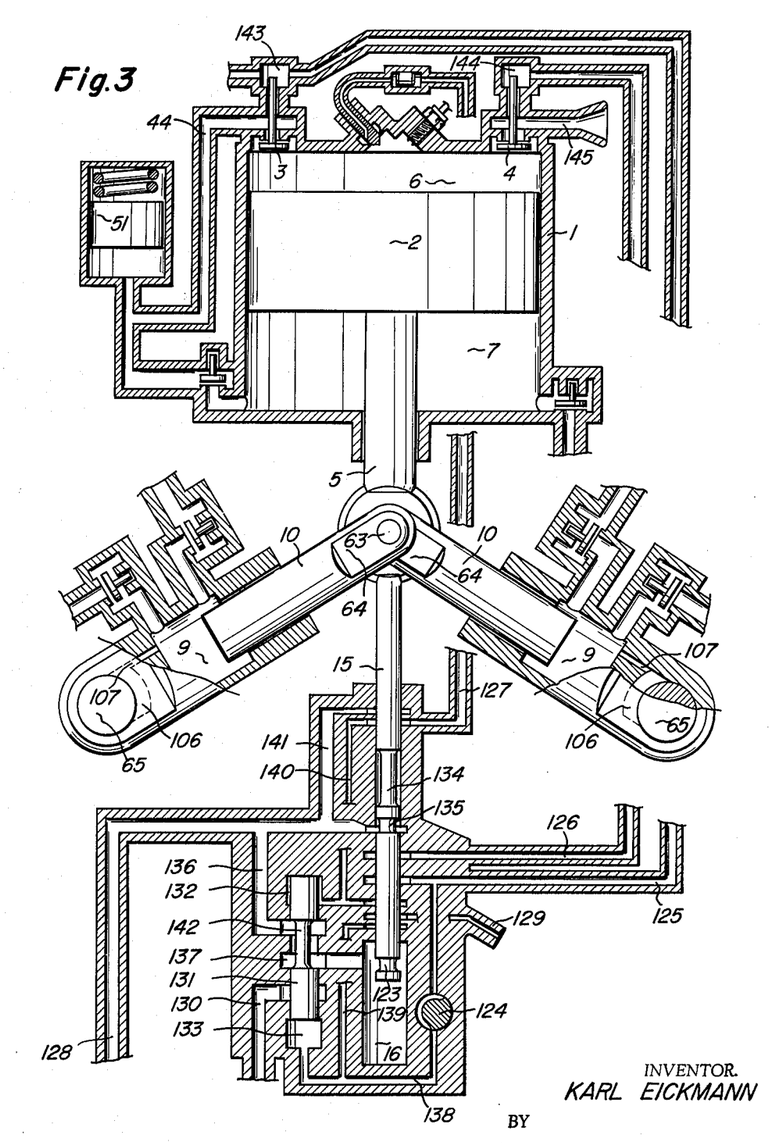
FIGURE 3 shows a further modification of the engine according to the invention which is provided with a control of the pressure medium.

According to the further embodiment of the invention as illustrated in FIG. 3 piston rod 5 is provided with a bore for receiving the pivot pin 63 on which pump pistons 9 of cylinders 10 are mounted by means of bearing eyes 64. Cylinders 10 are pivotally mounted by means of bearing pins 65. During the stroke of piston 2 the cylinders 10 together with pistons 9 carry out a pivotal movement about pins 65. According to this embodiment, bearing pins 63 and 65 may be arranged so that the force-times distance characteristic of pump pistons 10 is at least substantially adapted to the force-times-distance characteristic of piston 2 of the combustion engine.

This has the advantage that the bearings have to carry out only a part of one revolution at each work stroke about the pivot pins 63 and 65 and therefore incur very little friction, while the bearings of the crankshafts of conventional combustion engines must carry out at least one full revolution at each operation. If the pressure medium is conducted through channels 107 into the bearing pins 63 and 65 or the bearing eyes 64 or into the bearing eyes of pump cylinders 10, the medium forces in the balancing fields 106 will balance out entirely or at least partly any other forces acting thereon and thus reduce the frictional losses. The balancing fields 106, however, also may be omitted.

The reciprocating movement of the piston rod may be utilized for controlling hydraulic impulses or hydraulic drives. For this purpose the piston rod may be designed in the form of a hydraulic control piston. In order to prevent any tilting or cocking, it is still more advisable to connect the piston rod pivotably to one or more hydraulic control pistons. The control piston or the piston rod acting as a control piston is then provided with control grooves, control edges, or the like. Thus, for example, FIG. 3 illustrates one of the many possibilities of such a piston rod control. The control housing is supplied through the pressure line 128 with pressure medium which also branches off into the pressure lines 136 and 141. When the engine piston reaches the upper dead center or shortly prior to this time, the annular control groove 134 connects the pressure line 141 to the pressure line 127 and 140. At the same time the annular control groove 123 connects the pressure line 139 to the return line 129.

The pressure medium which is flowing into the pressure line 127 may drive a hydraulic piston which, in turn, drives the fuel injection device or the ignition device, and at the same time the pressure medium may flow through the pressure line 140 into the pressure chamber 132 and move the servo-control piston 131 to its opposite end position. The hydraulic medium may then escape from chamber 133 into the return line 129 through lines 138 and 139 and through the annular control groove 123 so that the servo-control piston 131 has completed the mentioned movement, the pressure line 137 is connected through the annular control groove 142 to the return line 130 so that the pressure medium can escape from the compression stroke cylinder 16 through lines 137 and 130 to the outside without incurring any noticeable resistance. The main piston may thus start its expansion movement and the piston rod extension 15 may plunge into the cylinder chamber 16. Shortly prior to the lower dead center position, the control groove 134 connects the pressure line 128 to the pressure line 126 so that the pressure medium flows through the pressure line 126 into the outlet valve cylinder 144 and opens the outlet valve 4. At the further movement to the lower dead-center, the annular control groove 134 connects the pressure lines 128 and 125 with each other and the annular control groove 135 connects the pressure line 140 and the return line 129 with each other.

Additional pressure medium which is contained in pressure line 128 under pressure may thereby flow through the pressure line 125 into the hydraulic cylinder 143 and thereby also open the inlet valve 143 through which the cylinder may be charged from line 44 and the pressure accumulator 51. At the same time, pressure medium flows from pressure line 125 through the pressure line 138 into chamber 133 whereby servo-piston 131 is forced into chamber 132. The pressure medium escapes from chamber 132 through the annular control groove 135 and the return line 129, and after servo-piston 131 has again connected the pressure line 136 with the cylinder chamber 16, the compression stroke and thus the engine cycle are started anew. In order to prolong the valve-opening period, delaying throttles 124 or control throttles 124 may be connected into the lines, for example, into the pressure line 138.

Figure 4:
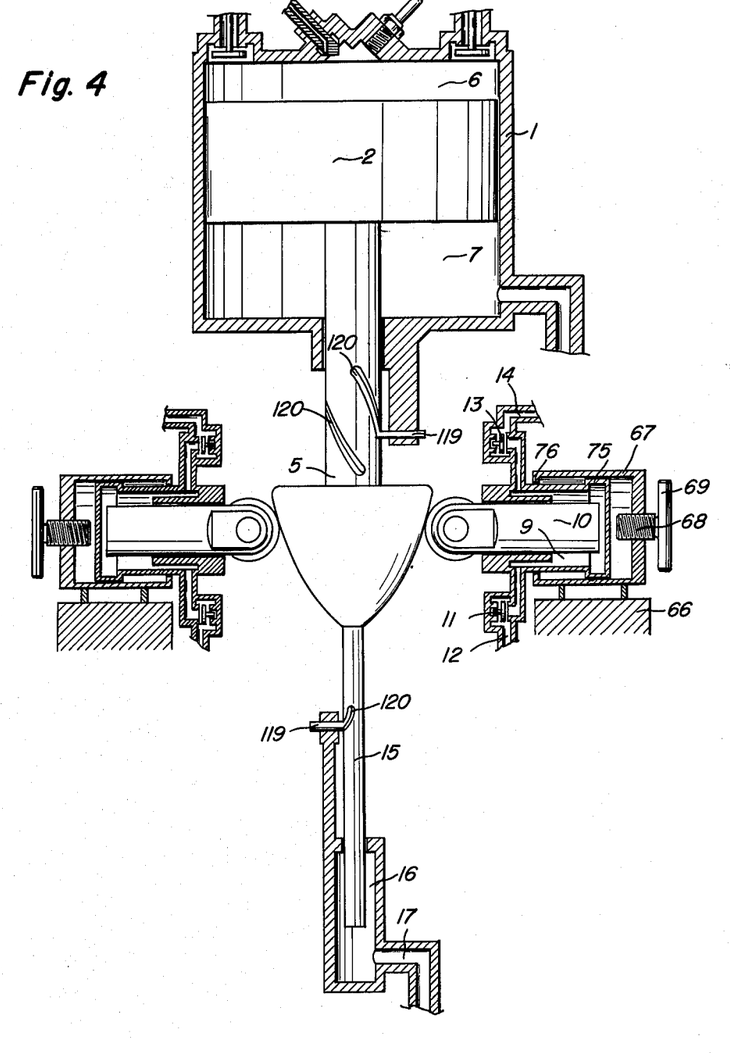
FIGURES 4 and 5 show two further modifications of the engine according to the invention.

FIGURE 4 illustrates an example of the manner in which the volume of pressure medium may be controlled. Insofar as the operation of the main piston, the main cylinder, the piston rod, and the cam on the piston rod are concerned, this embodiment may be designed similarly to the other embodiments as, for example, according to FIG. 8 or 9. The particular novelty of this embodiment over those previously described consists in the fact that the volume of the pressure medium conveyed which is produced by the pump piston 10 in pump cylinder 9 may be controlled independently of the velocity of the strokes of the main piston. Pump cylinder 9 is for this purpose slidably mounted within a guide bushing 67 which is mounted at 66 in a stationary position in any suitable manner, for example, on the engine base.

Guide bushing 67 is provided with a setscrew 68 which is disposed axially behind the pump cylinder 9. Guide bushing 67 is further provided with stops 76 and pump cylinder 9 with stops 75. Pump cylinder 9 is movable in the axial direction in guide bushing 67. In the forward direction, its movability is limited by the stops 76 and 75, while toward the rear its movability is limited by setscrew 68. If setscrew 68 is screwed back, pump cylinder 9 may yield toward the rear when piston 10 carries out its stroke and cam 48 presses the pump piston 10 into the pump cylinder 9. If setscrew 68 is screwed back entirely, pump cylinder 9 may yield entirely under the pressure of cam 48, so that the volume of pressure medium conveyed by the pump consisting of piston 10 and cylinder 9 is zero. The more the setscrew 68 is tightened, the more limited will be the movability of pump cylinder 9. If setscrew 68 is screwed in entirely, pump cylinder 9 can no longer yield and pump piston 10 will then deliver the full volume of pressure medium. Intermediate these two positions, the amount of medium conveyed is infinitely variable by an adjustment of setscrew 68. For starting the combustion engine and for the idle operation thereof the setscrew 68 is preferably screwed back completely in order to save fuel.

In place of the cylindrical guide bushing 67 it is also possible to employ other guiding means for the pump cylinder 9. For controlling and limiting the stroke of pump cylinder 9 it is also possible to employ other stop means or control means. Such control means may also be remote-controlled or automatically controlled. By the provision of helical grooves 120 and pins 119 or other suitable driving elements it is also possible to give the piston 2 an additional rotary movement so as to reduce its friction and increase the length of its useful life.

Figure 5:
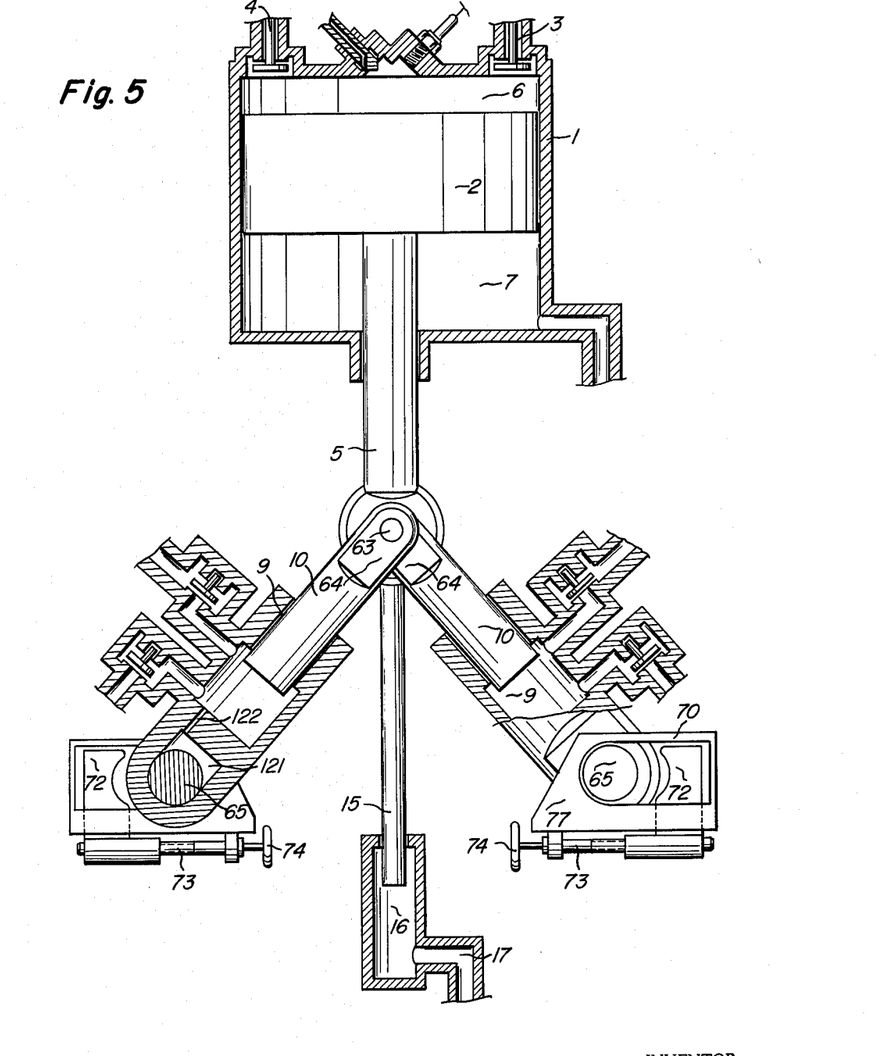

FIG. 5 illustrates on a further embodiment of the invention another manner in which the volume of pressure medium may be controlled. Insofar as the construction of the main cylinder, the main piston, the piston rod, the pump piston 10 and pump cylinders 9 are concerned, the engine according to FIG. 5 corresponds to the engine according to FIG. 3. The particular novelty of this embodiment resides in the fact that the bearing pin 65 of pump cylinder 9 is mounted in a guide 70 in which it is movable between the front stop 77 and a rear stop 72. The guide bed 70 is mounted in a stationary position, for example, on the engine housing, or it is integral with the latter. The rear stop 72 may be adjusted by a spindle 73 by means of a handwheel 74.

If the stop 72 is in its rear end position, pump cylinder 9 and its bearing pin 65 can move in guide 70 to such an extent that at the movement of the engine piston 2 with its piston rod 5 no pressure will be formed in pump cylinder 9 and the pump will not deliver any pressure medium. The more the stop 72 is tightened, for example, by means of spindle 73, the more the movability of cylinder 9 with bearing pin 65 will be limited in guide 70 and the greater will be the volume of pressure medium conveyed from the pump cylinder 9. If the bearing pin 65 is stopped completely by the stop 72, the amount of pressure medium conveyed from pump cylinder 9 reaches its maximum. An adjustment of stop 72 permits an infinite variation of the amount of pressure medium conveyed from the pump cylinder 9. Cylinders 9 may be mounted so as to incur very little friction by means of pressure-balancing fields 121 which may be supplied with pressure medium through lines 122.

The manner in which pump cylinder 9 according to FIG. 5 is mounted or constructed only forms one of many possibilities. The adjustability and the manner of limiting and freeing the movement of the guiding means of pump cylinder 9 may also be differently designed. It may also be adjusted and controlled by different mechanical means, by hand, hydraulically, electrically, or by a motor. Also, a remote control or an automatic adjustment is possible.

Figure 6:
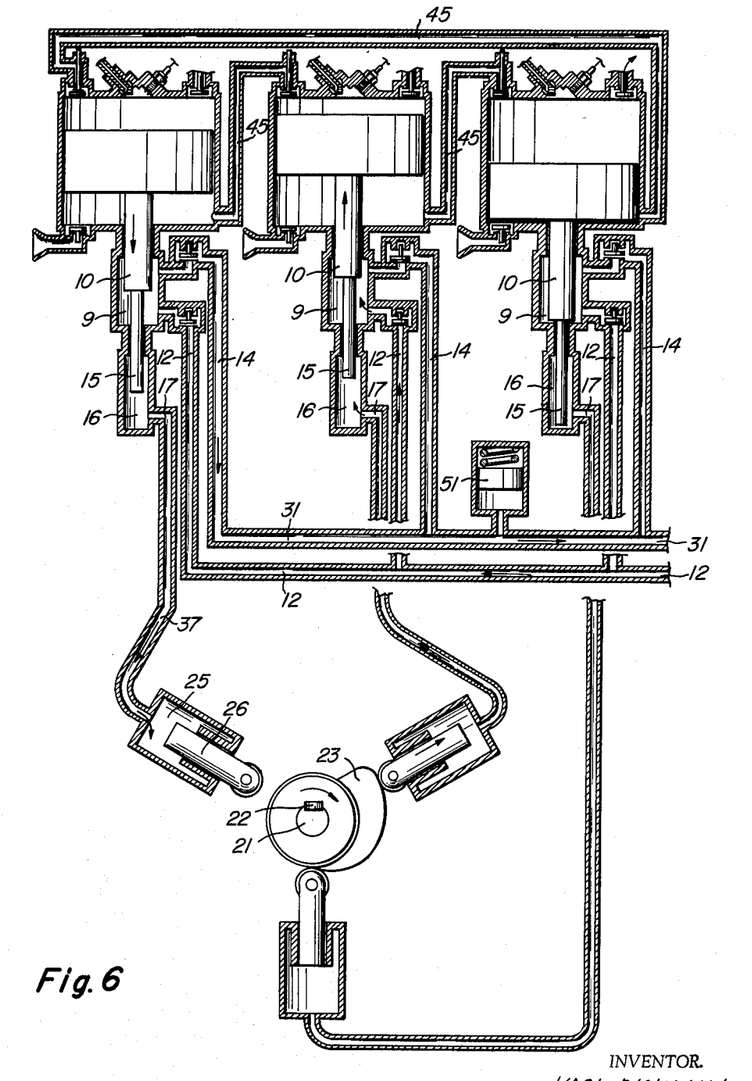
FIGURE 6 shows a modification in which several engines according to the invention are connected in series; and shows another modification of the engine according to the invention and of the control of the compression process thereof, in which the individual parts which are disposed in different planes are shown in sections extending through the center lines.

The manner in which a plurality of cylinders may be connected in series is illustrated, for example, in FIG. 6. According to this embodiment, all pistons pump the pressure medium through the pressure lines 14 into a common collecting line 31. The remainder of the control of the pistons may be similar as described with reference to FIG. 3 of the parental patent application Serial No. 128,490. Thus, there may again be a camshaft 21 which is provided with cams for controlling the various other movements and for transmitting these movements mechanically or hydraulically to the respective places of the engines. In the embodiment of FIG. 6 there are for the purpose of transmitting the compression stroke hydraulically from cam 23 on rotary shaft 21 pistons 26 entering first auxiliary pumping chambers 25 thereby pressing fluid out of the respective first auxiliary pumping chamber through the respective pipe or passage 17 into a respective pumping chamber 16. Thereby the respective piston extension or piston rod extension 15 is forced outwardly in pumping chamber 16 by the entering fluid and the compression stroke of the respective main pistons is thereby achieved and governed. The timing of the compression stroke is provided by the revolving of shaft 21 and the movement and configuration of cam or cams 23 thereon.

If the cylinders are connected in series as shown in FIG. 6, it is possible to connect the cylinder chambers 7 through lines 45 to the combustion chambers 6 of lateracting cylinders. Lines 45 may lead, for example, from cylinder 1 to cylinder 2 or from 1 to cylinder 3 or also from cylinder 1, for example, to cylinder 5 dependent upon the timed succession of the ignitions and the work stroke of the pistons. A smooth timely governed action of one engine after the other is thereby assured. Irregularities in the conveyance of the combined hydraulic pressure current in the collecting line 31 may be reduced by a hydraulic accumulator 51 of a conventional type.

Figure 7:
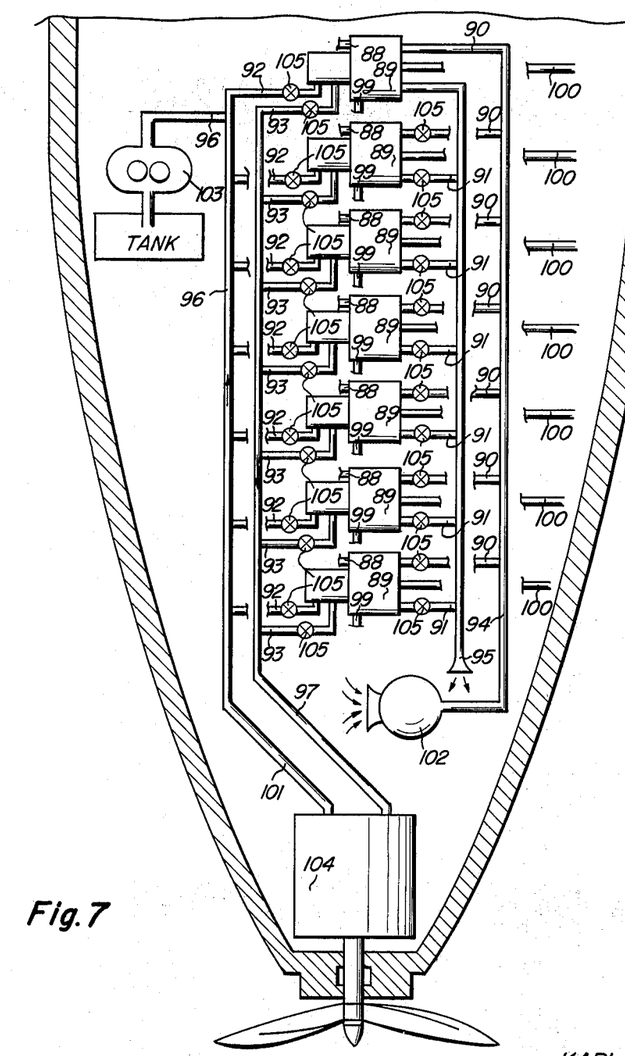
FIGURE 7 shows an engine battery according to the invention consisting of a number of combustion engines which are connected in series.

FIG. 7 shows a high output may be concentrated to drive one or several individual hydraulic engines by connecting a number of small engines according to the invention is parallel. The parallel engines 89 may be operated so that the ignition or the fuel injection occurs successively. The charging or injection may occur through one or several common injection lines 94 and through further feed lines 90, possibly under preliminary pressure which may be produced by a blower 102 acting upon line 94. The cylinder chambers 7 may convey the medium, for example, through lines 99 into the feed line 94 and draw in the medium through the injection lines 88. The exhaust gases may be conveyed through exhaust lines 91 into the common exhaust line 95. The pump medium may be supplied from the common feed line 96 through lines 92. Feed line 96 may also be placed under pressure by a pressure pump 103 and a pressure medium. The pressure medium conveyed may pass through lines 93 and the common pressure line 97 to drive one or more hydraulic engines 104.

From the hydraulic engine 104, the hydraulic medium may pass through the return line 101 into the feed line 96 or at an open circuit into the tank. By means of the shutoff valves 105, one or more engines may be disconnected from or connected to the engine battery.

Figure 8:
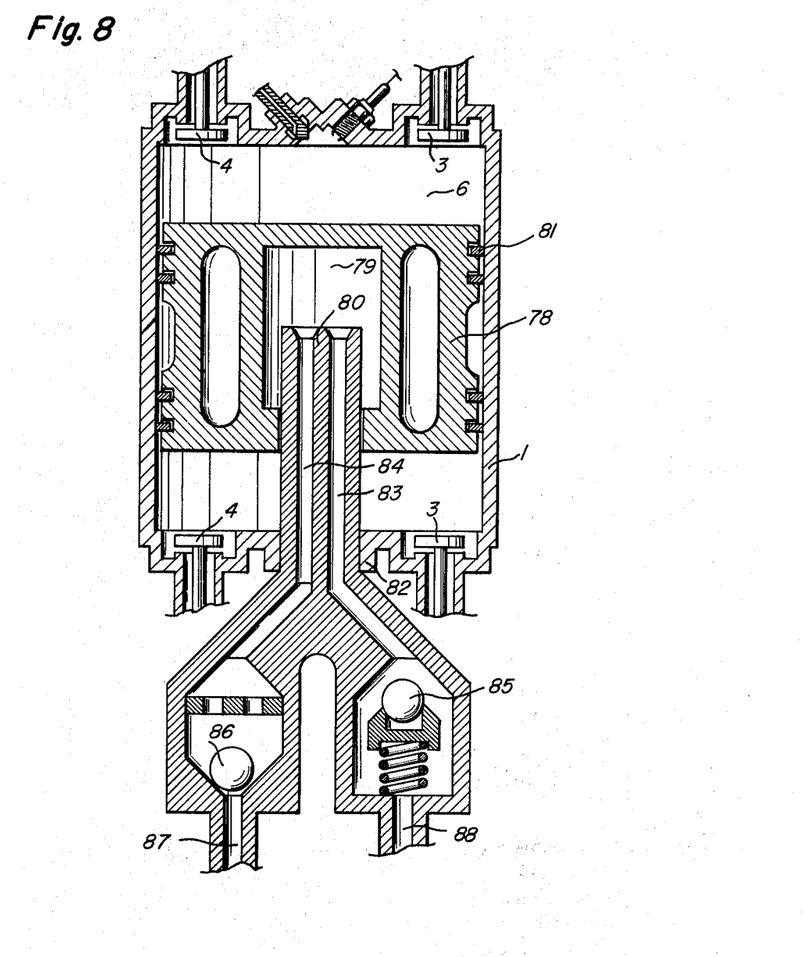
FIGURE 8 shows a modification of the engine according to the invention which is provided with a pumping device for the pressure medium within the piston of the combustion engine.

FIG. 8 illustrates a combustion engine according to the invention which requires very little spaces and material. The essential parts such as the cylinder 1, piston 78, valves 3 and 4, and the injection or ignition device may operate in the usual manner. The inventive simplification resides in the fact that the pump chamber 79 for pumping a sealing medium is contained within the piston 78 and that the pump piston or piston rod 80 extends into the pump chamber 79. During the reciprocating movement of the engine piston 78, pump chamber 79 is therefore enlarged or reduced since the shaft 80 of the pump piston is rigidly connected to the engine cylinder 1. When the pump chamber 79 is being enlarged, the pump medium is sucked in through the induction valve 86 and the induction line 84. When the pump chamber 79 is being reduced, the pump medium is forced out through the pressure line 83 and the pressure valve 85.

The pump medium is fed to the engine through the line 87 and it is discharged through the line 88. Shaft 80 of the pump piston is rigidly secured within the flange 82 of the engine cylinder 1. The pump medium lines 83 and 84 are provided at the inside of shaft 80. The point of entry of shaft 80 of the pump piston into the engine piston 78 or into the piston chamber 79 is sealed, for example, by a tight fit or a special sealing gasket or the like. The lower cylinder chamber 7 may be utilized for a preinjection or supercharging of air or a mixture of fuel and air or also for burning the gases. Engine piston 78 may be made hollow to reduce its weight and it may be provided in the usual manner with piston rings.

Figure 9:
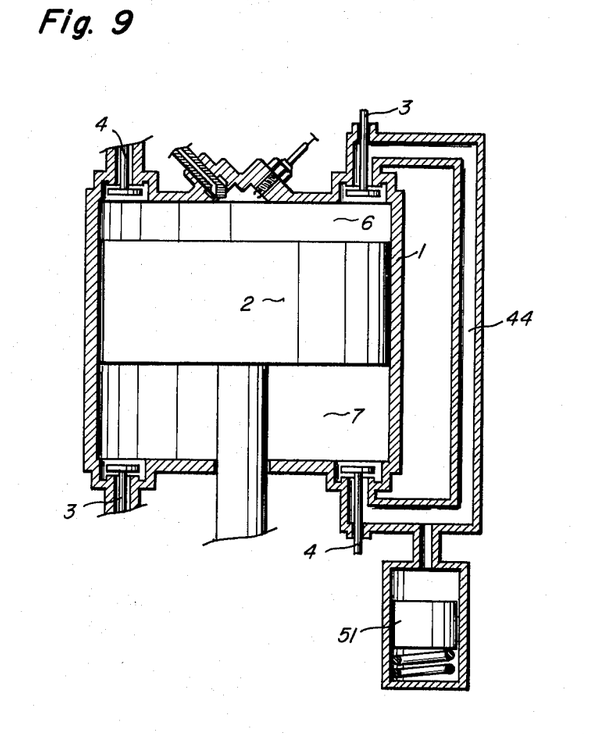
FIGURE 9 shows a longitudinal sectional view through another embodiment of the combustion engine according to this invention.

According to another embodiment of the invention, as illustrated in FIG. 9, chamber 7 in cylinder 1 is likewise provided with induction valves 3 and outlet valves 4. Chamber 7 may communicate with the combustion chamber 6 through the outlet valve 4, a channel 44, and the injection valve 3. When piston 2 moves upwardly, air or a mixture of fuel and air is precompressed in the cylinder chamber 7 and passed through the outlet valve 4 into channel 44 and into a pressure-accumulator 51 from which it passes subsequently into the combustion chamber 6 after the inlet valve 3 is opened. Chamber 7 may be provided with an inlet valve 3 for charging chamber 7 with fresh air or a mixture of fuel and air.

The present invention is by no means limited to the particular embodiments thereof as illustrated and described. In particular, slide or slot controls may be employed in place of valves, and in place of the hydraulic controls for the valves, ignition devices and the compression strokes, it is possible to provide mechanical transmitting means or controls. In place of the camshafts and cams, hydraulic slide controls or rotary piston controls may be employed which at certain times release certain amounts of pressure medium from accumulators or pressure lines for carrying out the different control or other movements, such as, for example, the compression stroke, the opening of the valves, the injection of the fuel, the ignition, etc.

The cam shafts may be driven mechanically or by means of hydraulic engines. Frequently it is possible to combine certain features of the individual embodiments with each other. In place of the cams as illustrated it is also possible to employ flat cams or the like on the piston rods 5.

Having thus fully disclosed my invention, what I claim is:

1. A piston engine comprising a main cylinder, a main piston reciprocably mounted in said main cylinder and defining in the same a combustion chamber; means for producing combustion in said combustion chamber whereby said main piston is driven in one direction in an expansion stroke; means acting on or in said main piston on or in a part thereof for moving said main piston in a direction opposite to said one direction in a compression stroke; pump means including a reciprocable pump member or members; force transmitting means operatively connecting said main piston with said reciprocable pump member, said force transmitting means varying the transmission ratio thereof at least during said expansion stroke for providing at least partially the equilibrium of the power delivered by said main piston with the power consumed by said reciprocable pump member or pump members during the said expansion stroke of said main piston.

2. The piston engine of claim 1 wherein said force transmitting means includes a curved cam body connected with said main piston, and wherein said reciprocable pump member or members are engaged and reciprocated by said cam body.

3. The piston engine of claim 1 including bearing means, and wherein said pump means includes a pumping chamber, said pumping chamber being borne by said bearing means which has an axis normal to the axis of said reciprocable pump member; said chamber being able to pivot around the axis of said bearing member, said reciprocable pump member or members being connected to said main piston or extension thereof by a second bearing means.

4. An engine as set forth in claim 3 and including a pivot means pivotally supporting said pivotally supported pump member; supporting means supporting said pivot means, and being adjustable between a first position in which said pivot means is stationary, and a plurality of adjusted positions in which said pivot means is free to perform a limited movement until again blocked whereby an adjustable part of the stroke of said reciprocable pump member is rendered ineffective for adjusting the pumped volume.

5. An engine according to claim 1 wherein said force transmitting means include a part operatively connected with said main piston for movement with the same along a path; and wherein said force transmitting means include other parts on said path operatively connected with a plurality of said pump members, respectively.

6. An engine according to claim 5 wherein two pump members are located on opposite sides of said path.

7. An engine according to claim 6 wherein said path is straight and extends in the direction of the axis of said main cylinder and of the movement of said main piston; and wherein said two pump members are simultaneously moved by said other parts of said force transmitting means to move in opposite directions toward and away from the same point of said path whereby transverse forces acting on said part which moves along said path are in equilibrium.

8. An engine according to claim 1 including a plurality of said pump members arranged and constructed to produce separate flows of hydraulic fluid at proportionate flow rates.

9. An engine according to claim 1 including a pair of said pump members of identical construction for producing two flows at equal flow rates.

10. A piston engine of claim 1 and including reciprocable control means connected to said main piston, and wherein the reciprocation of said reciprocable control means opens or closes passages for flow of fluid.

11. A free piston engine comprising a main cylinder; a main piston reciprocably mounted in said main cylinder and defining in the same a combustion chamber, said main piston having a part projecting out of said main cylinder; means for producing combustion in said combustion chamber whereby said main piston is driven in one direction in an expansion stroke; means acting on said part for moving said piston rod and said main piston in a direction opposite to said one direction in a compression stroke; pump means including a reciprocable pump member; and force transmitting means connecting said part with said reciprocable pump member and being constructed and arranged to vary the transmission ratio thereof at least during said expansion stroke so that the varying force produced by said main piston during said expansion stroke is transformed into a substantially uniform force acting on said pump member during its pressure stroke so as to at least partially maintain the equilibrium between the power output of said main piston and the power consumption of said pump piston.

12. A piston engine comprising a main cylinder; a main piston reciprocably mounted in said main cylinder and defining in the same a combustion chamber, said main piston having a part projecting out of said main cylinder; means for producing combustion in said combustion chamber whereby said main piston is driven in one direction in an expansion stroke; means acting on said part for moving said piston rod and said main piston in a direction opposite to said one direction in a compression stroke; pump means including a reciprocable pump member; and force transmitting means connecting said part with said reciprocable pump member and including cam means secured to said piston rod, and cam follower means connected to said pump member, said cam means having such a shape that the varying force produced by said main piston during said expansion stroke is transformed into a substantially uniform force acting on said pump member during its pressure stroke.

13. A piston engine comprising a main cylinder; a main piston reciprocably mounted on said main cylinder and defining in the same a combustion chamber, said main piston having a part projecting out of said main cylinder means for producing combustion in said combustion chamber whereby said main piston is driven in one direction in an expansion stroke; means acting on said part for moving said piston rod and said main piston in a direction opposite to said one direction in a compression stroke; pump means including a reciprocable pump member, and a pivotally supported pump member, one of said pump members being a piston and the other pump member being a chamber; and force transmitting means including a pivot means on said piston rod pivotally supporting said reciprocable pump member so that said reciprocable pump member is reciprocated while said pivotally supported pump member rocks whereby said reciprocable pump member reciprocates at varying angles to the direction of movement of said piston rod so that the varying force produced by said main piston during said expansion stroke is transformed into a substantially uniform force acting on said reciprocable pump member during its pressure stroke.

14. A free piston engine comprising a main cylinder; a main piston reciprocably mounted in said main cylinder and defining in the same a combustion chamber, said main piston having a part projecting out of said main cylinder; means for producing combustion in said combustion chamber whereby said main piston is driven in one direction in an expansion stroke; means acting on said part for moving said piston rod and said main piston in a direction opposite to said one direction in a compression stroke; pump means including a reciprocable pump member and a stationary pump member, one of said pump members being a piston and the other pump member being a cylinder; supporting means supporting said stationary pump member and being adjustable between a first position in which said stationary pump member is fixed in a normal position and a plurality of adjusted positions in which said stationary pump member is free to perform limited movements until again blocked whereby an adjustable part of the stroke of said reciprocable pump member is rendered ineffective; and force transmitting means connecting said part with said reciprocable pump member and including cam means secured to said piston rod, and cam follower means connected to said pump member, said cam means having such a shape that the varying force produced by said main piston during said expansion stroke is transformed into a substantially uniform force acting on said pump member during its pressure stroke.

15. A free piston engine comprising a main cylinder; a main piston reciprocably mounted in said main cylinder and defining in the same a combustion chamber, said main piston having a part projecting out of said main cylinder; means for producing combustion in said combustion chamber whereby said main piston is driven in one direction in an expansion stroke; means acting on said part for moving said piston rod and said main piston in a direction opposite to said one direction in a compression stroke; pump means including a reciprocable pump member and a stationary pump member, one of said pump members being a piston and the other pump member being a cylinder; supporting means supporting said stationary pump member and being adjustable between a first position in which said stationary pump member is fixed in a normal position and a plurality of adjusted positions in which said stationary pump member is free to perform limited movements until again blocked whereby an adjustable part of the stroke of said reciprocable pump member is rendered ineffective; and force transmitting means connecting said part with said reciprocable pump member and being constructed and arranged so that the varying force produced by said main piston during said expansion stroke is transformed into a substantially uniform force acting on said pump member during its pressure stroke.

16. An adjustable pump comprising, in combustion, a driven pump member reciprocable in pump and return strokes; a non-driven pump member, one of said pump members having a piston and the other pump member having a chamber receiving said piston; supporting means supporting said non-driven pump member for movement with said driven pump member relative to said supporting means; and adjustable stop means on said supporting means settable between a normal position for blocking said non-driven pump member to prevent movement of the same relative to said supporting means during the reciprocating strokes of said driven pump member, and a plurality of adjusted positions for blocking said non-driven pump member after limited movement relative to said supporting means with said driven pump member so that the latter moves in a pumping stroke relative to said non-driven pump member only when the same has been blocked.

17. An adjustable pump according to claim 16 including pivot means for supporting said non-driven pump member and being supported on said supporting means for movement with said non-driven pump member; and wherein said adjustable stop means cooperate with said pivot means for blocking movement of the same.

18. An adjustable pump according to claim 16 wherein said supporting means supports said non-driven pump member for movement in the direction of reciprocation of said driven pump member.

19. An apparatus comprising a combustion engine including a drive member performing a movement during combustion and expansion of fuel in said combustion engine; pump means including a movable pump member; and force transmitting means operatively connecting said drive member with said pump member for operating said pump member, and having a varying transmission ratio during said movement of said drive member for transmitting from said drive member to said pump member such a force as to maintain the equilibrium between the power output of said drive member and the power consumption of said pump member at least during part of said movement.

20. An engine comprising a main cylinder; a main piston mounted in said main cylinder for reciprocation and defining in the same a combustion chamber; means for producing combustion in said combustion chamber whereby said main piston is driven in one direction in an expansion stroke; means for moving said main piston in a direction opposite to said one direction in a compression stroke; pump means including a reciprocable pump member; and force transmitting means varying the transmission ratio thereof at least during said expansion stroke for transmitting from said main piston to said reciprocable pump member a variable component of the force produced by said main piston during said expansion stroke so that the pressure produced by said reciprocable pump member in said pump means is substantially constant during said expansion stroke of said main piston so as to at least partially maintain the equilibrium between the power output of the main piston and the power consumption of said pump member.

21. An engine comprising a main cylinder; a main piston mounted in said main cylinder for reciprocation and defining in the same a combustion chamber; means for producing combustion in said combustion chamber whereby said main piston is driven in one direction in an expansion stroke; means for moving said main piston in a direction opposite to said one direction in a compression stroke; pump means including a reciprocable pump member, said pump means including a pivotally mounted pump cylinder receiving said reciprocable pump member; a stationary member supporting said pump cylinder for movement relative to said pump member; adjustable stop means for limiting said movement of said pump cylinder; and force transmitting means for transmitting from said main piston to said reciprocable pump member a variable component of the force produced by said main piston during said compression stroke so that the pressure produced by said reciprocable pump member in said pump cylinder is substantially constant during said expansion stroke of said main piston.

22. An engine as set forth in claim 21 wherein said main piston includes a piston rod, and wherein said force transmitting means include a cam on said piston rod for controlling said reciprocable pump member.

23. An engine as set forth in claim 21 and wherein said main piston includes a piston rod; and wherein said force transmitting means include pivot means for pivotally mounting said reciprocable pump member on said piston rod.

24. An engine as set forth in claim 20 wherein said main piston includes a piston rod; and wherein said force transmitting means include pivot means for pivotally mounting said reciprocable pump member on said piston rod.

25. An engine as set forth in claim 21 wherein said main piston includes a piston rod projecting out of said main cylinder; wherein said force transmitting means include a pivot for pivotally mounting said reciprocable pump member on said piston rod; and including a pivot means for mounting said pump cylinder for angular displacement; and a guide means for guiding said last mentioned pivot means in a direction transverse to said piston rod.

References Cited by the Examiner

UNITED STATES PATENTS

| | | | |
|---|---|---|---|
| 1,349,394 | 8/1920 | Trump et al. | 103—54 X |
| 2,148,899 | 2/1939 | Carski et al. | 103—159 X |
| 2,391,972 | 1/1946 | Hufford et al. | 103—54 |
| 2,661,592 | 12/1953 | Bright | 103—54 X |
| 2,978,986 | 4/1961 | Carder et al. | 103—54 X |
| 2,991,763 | 7/1961 | Cardiou | 103—54 X |

ROBERT M. WALKER, *Primary Examiner.*